United States Patent [19]

Thompson

[11] Patent Number: 4,620,440

[45] Date of Patent: Nov. 4, 1986

[54] EGR VALVE TEST FIXTURE

[75] Inventor: Vernon F. Thompson, Crestwood, Mo.

[73] Assignee: Tomco, Inc., St. Louis, Mo.

[21] Appl. No.: 773,460

[22] Filed: Sep. 9, 1985

[51] Int. Cl.[4] .......... G01M 19/00
[52] U.S. Cl. .......... 73/118.1
[58] Field of Search .......... 73/118, 49.7, 168

[56] References Cited

U.S. PATENT DOCUMENTS

| | | | |
|---|---|---|---|
| 2,258,224 | 10/1941 | Sheppard | 73/49.7 |
| 4,149,408 | 4/1979 | Ezoe et al. | 73/118 |
| 4,428,223 | 1/1984 | Trevisan | 73/168 |
| 4,566,310 | 1/1986 | Cohen et al. | 73/168 |

*Primary Examiner*—Stewart J. Levy
*Assistant Examiner*—Robert R. Raevis
*Attorney, Agent, or Firm*—Polster, Polster and Lucchesi

[57] ABSTRACT

A test fixture for EGR valves has a support with a flat upper surface with a well opening through it spaced from the boundaries of the upper surface. A conduit, open at two ends, communicates with the atmosphere at one end and with the well intermediate its ends. A venturi tube communicates with the other end of the conduit. The venturi tube has a throat portion and an aspirating line communicating at one end with the throat portion of the venturi tube and at the other with a vacuum fitting for connection to the vacuum fitting of an EGR valve resting on the flat upper surface of the fixture. A pressure fitting is connected to the venturi tube to accommodate a complementary fitting from a source of gas under pressure. The venturi tube and conduit are dimensioned and arranged to deliver a vacuum to the vacuum fitting and a pressure to the well of a magnitude at which the EGR valve will operate normally if the EGR valve is in operating condition.

7 Claims, 5 Drawing Figures

EGR VALVE TEST FIXTURE

BACKGROUND OF THE INVENTION

The exhaust gas recirculating (EGR) valve is an important part of the emissions control system of the modern automotive vehicle. It is also a fairly expensive component. However, most garages and repair shops are not equipped to test the operation of EGR valves because those valves rely upon vacuum or vacuum and pressure for their operation. The ones that require both vacuum and pressure respond to a low pressure to close a pilot valve to permit a diaphragm to respond to a vacuum. Under present circumstances, if an automobile, for example, fails to pass an emissions test, it is not uncommon for the garage or repair shop simply to replace the EGR valve for want of a means for testing the old one.

An EGR valve has a flat mounting surface, and a domed vacuum chamber, a lower wall of which is formed by a movable diaphragm. A vacuum fitting projects from the dome, for connection to a hose communicating with the intake manifold. Most of the EGR valves have a passage in the flat mounting surface communicating with a plunger type valve stem, which moves up in response to pressure from the exhaust manifold to close an opening in the diaphragm, so that, until pressure is built up in the exhaust manifold, the diaphragm will not move to open the EGR valve. The domed chamber and diaphragm are frequently supported by a kind of spider, which leaves at least a part of the diaphragm visible from below.

One of the objects of this invention is to provide a test fixture for EGR valves that will accommodate all presently used standard EGR valves, and which can be used with the equipment commonly found in garages and repair shops.

Another object is to provide such a test fixture that is simple, economical, safe, effective and easy to use.

Other objects will become apparent to those skilled in the art in the light of the following description and accompanying drawing.

SUMMARY OF THE INVENTION

In accordance with this invention, generally stated, a test fixture is provided for EGR valves having a flat mounting surface and a vacuum fitting communicating with a chamber on one side of a diaphragm movable in response to a predetermined vacuum. The fixture includes a support having a flat upper surface with a well opening through it spaced from the boundaries of the upper surface, the well being adapted to communicate with a pressure responsive pilot member of an EGR valve. A conduit, open at two ends, communicates with the atmosphere at one end and with the well intermediate its ends. A venturi tube communicates with the other end of the conduit, the venturi tube having a throat portion and an aspirating line communicating at one end with the throat portion of the venturi tube and at its other end with a vacuum fitting for communicating with the vacuum fitting of an EGR valve resting with its flat mounting surface on the flat upper surface of the fixture. A pressure fitting is connected to the venturi tube for connection to a source of gas under pressure, such as an air compressor of the sort found in every garage and repair shop. The venturi tube and conduit are so dimensioned and arranged as to deliver a vacuum to the vacuum fitting of the EGR valve and a pressure to the well of the valve of a magnitude at which the EGR valve will operate normally if the valve is in operating condition.

In the preferred embodiment, the fixture is in the form of a rectangular block of plastic, and the conduit, venturi tube, and aspirating line passage are formed within the block, and the flat upper surface of the test fixture support is mirrored, so that the operation of the diaphragm can be observed directly. The end of the conduit that communicates with the atmosphere can be provided with a muffler or air deflector that serves a double function of reducing the noise and of controlling the pressure supplied to the well. An adaptor can also be provided at the venturi end to permit the use of a lower pressure of compressed air or gas, so that a small compressor, with an accumulator, if necessary, can be used.

DESCRIPTION OF THE PREFERRED EMBODIMENTS

Figure 1:
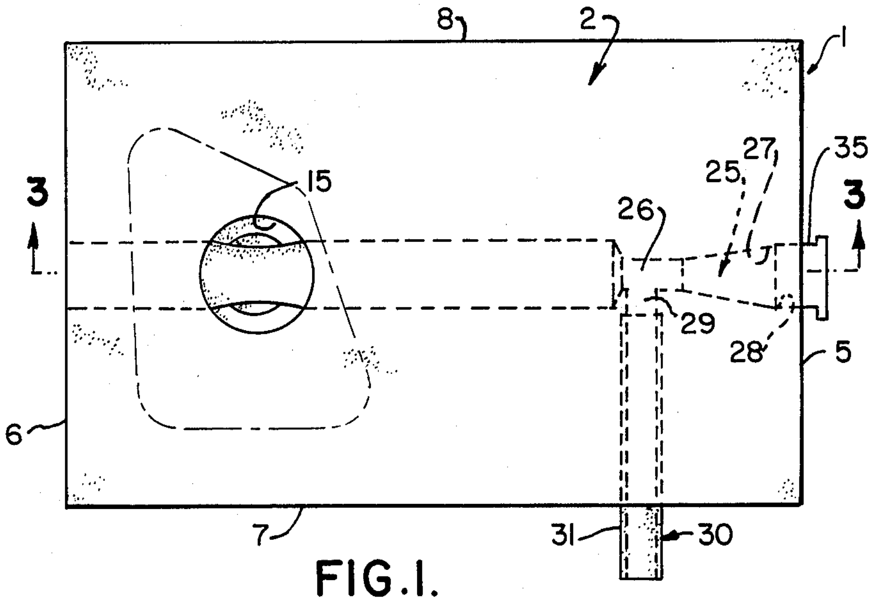
FIG. 1 is a top plan view of one embodiment of test fixture of this invention, with internal passages indicated in dotted lines.

Referring now to the drawings, and particularly to FIGS. 1 through 5, for one illustrative embodiment of fixture of this invention, reference numeral 1 indicates a basic fixture. In this embodiment, the fixture is in the form of a rectangular block 2 of plastic, with a flat bottom surface 3, a flat top surface 4, an intake end 5, an outlet end 6, an aspirator side 7, and an opposite side 8.

In this embodiment, the top surface 4 has a mirror surface 10 on it, which can be provided by laminating to it a thin sheet of plastic coated with a reflective metal.

Figure 3:
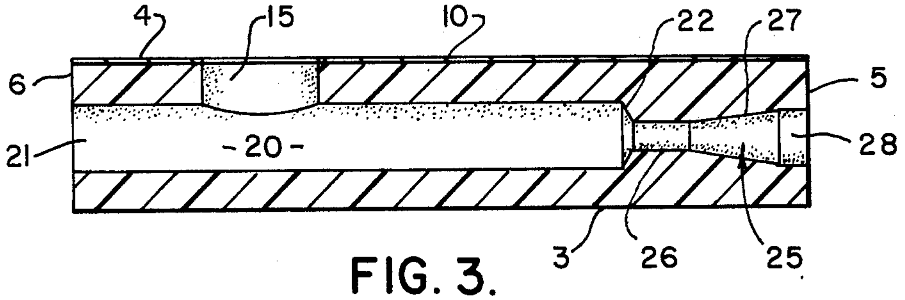
FIG. 3 is a sectional view taken along the line 3—3 of FIG. 1, without a pressure fitting.
Figure 4:
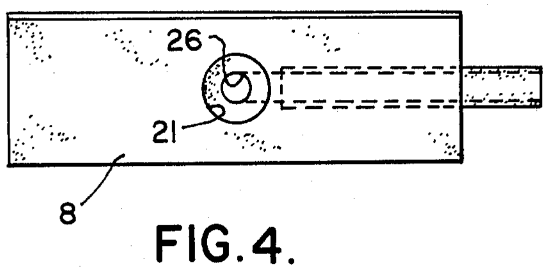
FIG. 4 is an end view, viewed from left to right of FIG. 1.

A well 15, centered on the long axis of the rectangular block but positioned nearer the outlet end 6 of the block than to the inlet end, opens upwardly through the upper surface 4, but stops short of the lower surface 3, as shown particularly in FIG. 3.

Figure 2:
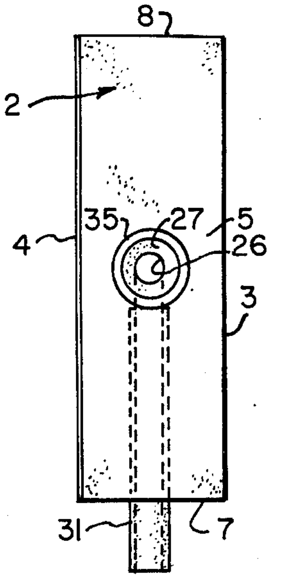
FIG. 2 is an end view, viewed from right to left of FIG. 1.

A straight, two-ended conduit 20 has its axis coincident with the long centerline of the block. The conduit 20 has an outlet end 21 opening through the outlet end 6 of the block, and an inlet end 22, communicating with a throat 26 of a venturi tube 25. The venturi tube, like the conduit 20, is formed in place in the block. The venturi tube 25 has, in addition to the throat 26, a truncatedly conical section 27 and a cylindrical section 28 that opens through the intake end 5 of the block, as shown in FIGS. 2 and 3. A standard compressed air fitting 35 is secured in the cylindrical section 28 of the venturi tube.

The well 15 intersects with the conduit 20 intermediate the ends of the conduit, and communicates directly therewith as shown in FIGS. 1 and 3.

An aspirating passage 29 with its axis perpendicular to the axis of the venturi tube, communicates at one end with the throat 26 and opens through the aspirator side 7 of the block. In the embodiment shown, the passage 29 is enlarged to receive tightly an aspirating tube 30 the internal diameter of which is the same as the outside diameter of the passage 29 between the end of the tube 30 and the throat 26. The tube 30 projects beyond the side 7 of the block to provide a nipple 31 to which a flexible hose can be attached.

In the operation of the device of this embodiment, an EGR valve 40, which conventionally has a flat mounting surface and a pressure responsive pilot member 42, is simply set with its flat mounting surface on the upper surface 4 of the fixture. If the pilot member has a projecting cowling, it extends into the well 15. Locating pins or the like can be provided if desired. The passage through the flat mounting surface of the valve is aligned with the well 15, and a flexible hose, connected at one end to the nipple 31, is connected at its other end to a vacuum nipple 41 of the EGR valve. A conventional fitting on a compressed air hose is attached to the fitting 35, and compressed air at a pressure of 80 psi, for example, is admitted. The venturi tube is such as to provide a vacuum of about 10 inches of mercury, and the relative proportions of the conduit 20 are such as to produce about 6 psi at the well 15. These are the normal operating conditions for an EGR valve. The conventional EGR valve has a base smaller than the mirrored surface 10, as indicated somewhat exaggeratedly in phantom lines in FIG. 1. By looking at the reflection of the diaphragm in the mirrored surface 10, one can observe the operation of the diaphragm, hence of the valve, without having to bend down to look. It has been found that a single venturi can be used with pressures from about forty pounds to one hundred fifty pounds per square inch, the vacuums and pressures remaining within acceptable working limits.

Figure 5:
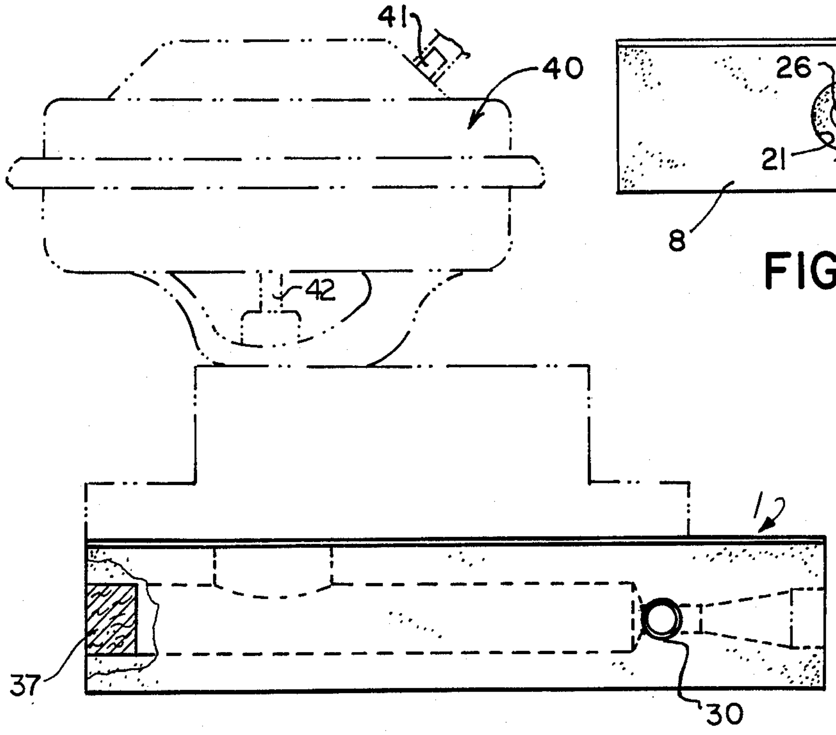
FIG. 5 is a view in side elevation, with an EGR valve, shown in phantom lines, mounted on the fixture.

Numerous variations in the construction of the test fixture of this invention, within the scope of the appended claims, will occur to those skilled in the art in the light of the foregoing disclosure. Merely by way of example, the shape of the throat or orifice section of the venturi can be modified as is well known. The upper surface of the fixture can be provided by a separate platform, and the venturi, conduit and well can be formed of metal or the like. The conduit and venturi need not lie on the long centerline of the block or platform, and the platform can assume different shapes. The pressure fitting means for connecting the venturi inlet to a source of gas can be varied, to provide a permanent connection, for example, to an air hose. Gases different from air can be employed. A pressure regulator can be attached to the fixture to insure that the amount of pressure supplied is uniform. Other sources of compressed air, or other compressed gases, such as nitrogen or carbon dioxide, can be used. Additional attachments, to adapt the fixture to use with gas under lower pressures (or to provide different degrees of vacuum for non-standard EGR valves) can be provided. Gas diffuser porous packing 37, as shown in FIG. 5, baffles or adjustable choke means can be provided at the outlet end 21 of the conduit, so as to reduce noise, direct the escaping gas out of harm's way or permit adjustment of the pressure supplied to the well 15 to accommodate EGR valves intended for different kinds of internal combustion engines. These are merely illustrative.

I claim:

1. A test fixture for EGR valves having a flat mounting surface and a vacuum fitting communicating with a chamber on one side of a diaphragm movable in response to a predetermined vacuum, said fixture comprising a support having a flat upper surface with a well opening through it spaced from the boundaries thereof, said well being adapted to communicate with a pressure responsive pilot member of an EGR valve; a conduit, open at two ends, communicating with the atmosphere at one end and with said well intermediate its ends; a venturi tube communicating with the other end of said conduit, said venturi tube having a throat portion and an aspirating line communicating at one end with said throat and adapted at another end to communicate with said vacuum fitting of an EGR valve resting with its flat mounting surface on said flat upper surface of said fixture, and pressure fitting means connected to said venturi tube for connection to a source of gas under pressure, said venturi tube and conduit being dimensioned and arranged to deliver, when gas under pressure is passed through the tube and conduit, a vacuum to said vacuum fitting and a pressure to said well of a magnitude at which said EGR valve will operate normally if said EGR valve is in operating condition.

2. The fixture of claim 1 wherein the said upper surface of said support is mirrored, whereby operation of said EGR valve diaphragm can be observed by its reflection.

3. A fixture of claim 1 wherein the said support is a block of substantial thickness and said conduit and said venturi tube are parts of said block.

4. The fixture of claim 3 wherein the block has top, bottom and side surfaces and said aspirating line extends through and projects beyond a side surface of said block.

5. The device of claim 1 including a muffler at an outlet end of said conduit, through which the conduit communicates with the atmosphere.

6. A test fixture for EGR valves having a flat mounting surface and a vacuum fitting communicating with a chamber on an upper side of a diaphragm movable in response to a predetermined vacuum, said fixture comprising a support in the form of a rectangular block of plastic material, with flat upper and lower surfaces and side and end surfaces joining the boundaries of said upper and lower surfaces, a well, opening through said upper surface and extending short of said lower surface, said well being positioned inboard of said side and end surfaces; a conduit in the form of a two-ended straight passage communicating at one end with the atmosphere and communicating with said well intermediate the length of said passage; a venturi tube in the form of a passage opening through the opposite end of said block and having a throat portion axially alligned with and communicating with the other end of said conduit and an aspirating line passage communicating at one end with said throat portion and at its other, with an aspirating line for communicating with the vacuum fitting of said EGR valve.

7. The device of claim 6 wherein the upper surface of the fixture is mirrored, whereby operation of the EGR valve diaphragm can be observed by its reflection.

* * * * *